(12) United States Patent
Leclaire (10) Patent No.: US 10,302,820 B2
(45) Date of Patent: May 28, 2019

(54) OPHTHALMIC LENS COMPRISING A COATING THAT MINIMIZES ULTRAVIOLET REFLECTIONS AND METHOD FOR THE PRODUCTION OF SUCH A LENS

(71) Applicant: ESSILOR INTERNATIONAL (COMPAGNIE GENERALE D'OPTIQUE), Charenton-le-Pont (FR)

(72) Inventor: Yves Leclaire, Charenton-le-Pont (FR)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 0 days.

(21) Appl. No.: 15/500,209

(22) PCT Filed: Jul. 28, 2015

(86) PCT No.: PCT/FR2015/052088
§ 371 (c)(1),
(2) Date: Jan. 30, 2017

(87) PCT Pub. No.: WO2016/016574
PCT Pub. Date: Feb. 4, 2016

(65) Prior Publication Data
US 2017/0261648 A1    Sep. 14, 2017

(30) Foreign Application Priority Data

Jul. 30, 2014    (FR) ..................... 14 57385

(51) Int. Cl.
*G02B 1/11*    (2015.01)
*G02B 1/111*    (2015.01)
(Continued)

(52) U.S. Cl.
CPC .............. *G02B 1/111* (2013.01); *B05D 5/06* (2013.01); *G02B 1/08* (2013.01); *G02C 7/022* (2013.01);
(Continued)

(58) Field of Classification Search
CPC .. G02B 1/111; G02B 1/11; G02B 1/10; G02B 1/08; B05D 5/06; G02C 7/022; G02C 7/108; G02C 7/12; G02C 2202/16
(Continued)

(56) References Cited

U.S. PATENT DOCUMENTS 3,247,392 A * 4/1966 Thelen ................ C03C 17/3452
                                                            136/257
4,168,113 A * 9/1979 Chang ................ C03C 17/3417
                                                            351/159.57
(Continued)

FOREIGN PATENT DOCUMENTS

EP    0614957    9/1994

OTHER PUBLICATIONS

Haupt, M. et al.: "Realization of an Economical Polymer Optical Fiber Demultiplexer," 2006 International Students and Young Scientists Workshop "Photonics and Microsystems", XP055186482, https://arxiv.org/ftp/arxiv/papers/0705/0705.3964.pdf [Retrieved from the internet on Apr. 28, 2015].
(Continued)

*Primary Examiner* — William R Alexander
(74) *Attorney, Agent, or Firm* — Norton Rose Fulbright US LLP (57) ABSTRACT

The invention relates to an ophthalmic lens comprising: a substrate having a given refractive index; and a coating that minimizes ultraviolet reflections, said coating having a given refractive index and being deposited on a rear face of the substrate. According to the invention, the thickness of the ultraviolet-reflection-minimizing coating is between 1 μm and approximately 200 μm and the refractive index of the ultraviolet-reflection-minimizing coating is at least 0.15
(Continued)

units less than the refractive index of the substrate. The invention also relates to a method for the production of such a lens.

19 Claims, 1 Drawing Sheet

(51) Int. Cl.
　　*G02C 7/02*　　(2006.01)
　　*B05D 5/06*　　(2006.01)
　　*G02B 1/08*　　(2006.01)
　　*G02C 7/10*　　(2006.01)
　　*G02C 7/12*　　(2006.01)
(52) U.S. Cl.
　　CPC ............... *G02C 7/108* (2013.01); *G02C 7/12* (2013.01); *G02C 2202/16* (2013.01)
(58) Field of Classification Search
　　USPC ............... 351/159.56, 159.62; 359/601
　　See application file for complete search history.

(56) References Cited

U.S. PATENT DOCUMENTS

| | | | | |
|---|---|---|---|---|
| 4,617,252 A | * | 10/1986 | Cordes, III | H01L 21/0276 430/272.1 |
| 4,657,805 A | * | 4/1987 | Fukumitsu | B32B 27/30 428/215 |
| 5,328,975 A | * | 7/1994 | Hanson | C09D 183/14 427/372.2 |
| 5,846,650 A | * | 12/1998 | Ko | G02B 1/105 296/84.1 |
| 6,793,339 B1 | * | 9/2004 | Yip | G02B 1/105 351/159.62 |
| 7,520,608 B2 | * | 4/2009 | Ishak | G02C 7/104 351/159.65 |
| 7,692,855 B2 | | 4/2010 | Arrouy et al. | |
| 2002/0024705 A1 | | 2/2002 | Nakano | |
| 2003/0082399 A1 | * | 5/2003 | He | G02B 1/111 428/689 |
| 2003/0165698 A1 | | 9/2003 | Vaneeckhoutte et al. | |
| 2004/0074261 A1 | * | 4/2004 | Caron | G02B 1/111 65/396 |
| 2004/0145700 A1 | * | 7/2004 | Miniutti | G02C 7/02 351/159.56 |
| 2004/0145701 A1 | * | 7/2004 | Miniutti | G02C 7/02 351/159.24 |
| 2004/0145802 A1 | * | 7/2004 | Miniutti | G02C 7/02 351/159.62 |
| 2008/0002260 A1 | * | 1/2008 | Arrouy | G02B 1/115 359/586 |
| 2008/0047468 A1 | * | 2/2008 | de Rojas | C08J 7/047 106/287.11 |
| 2011/0128664 A1 | * | 6/2011 | Coue | G02B 1/116 361/220 |
| 2011/0228400 A1 | * | 9/2011 | Cretier | C08J 7/045 359/586 |
| 2015/0241602 A1 | * | 8/2015 | Avetisian, Sr. | G02B 1/113 359/359 |
| 2017/0139091 A1 | * | 5/2017 | De La Vega | G02B 5/0221 |

OTHER PUBLICATIONS

International Search Report for PCT/FR2015/052088, dated Nov. 11, 2015.

* cited by examiner

OPHTHALMIC LENS COMPRISING A COATING THAT MINIMIZES ULTRAVIOLET REFLECTIONS AND METHOD FOR THE PRODUCTION OF SUCH A LENS

CROSS-REFERENCE TO RELATED APPLICATIONS

This application is a national phase application under 35 U.S.C. § 371 of International Application No. PCT/FR2015/052088 filed 28 Jul. 2015, which claims priority to French Application No. 1457385 filed 30 Jul. 2014. The entire contents of each of the above referenced disclosures is specifically incorporated by reference herein without disclaimer.

The present application relates to an ophthalmic lens.

It relates more particularly to an ophthalmic lens for protecting the eyes relative to ultraviolet (UV) radiation, and in particular for protecting the eyes from UV radiation (generally within the range 100 nm to 400 nm approximately) reflected on a rear lens face.

An ophthalmic lens is for example known that has a substrate and an antireflection coating deposited under vacuum making it possible to reduce an amount of ultraviolet radiation reflected on the rear face of the lens. The antireflection coating then consists of a stack of several layers of inorganic materials having a thickness of several nanometers, typically between around 10 nm and around 400 nm.

In the particular case of a high-index substrate, that is to say a substrate having a refractive index greater than around 1.56, or even 1.6, the difference in index between the air and the substrate accentuates the reflection of ultraviolet (UV) radiation on the rear face of the glass, which therefore reduces the UV protection. The indices of the ophthalmic lenses currently sold range up to around 1.74 for polymer materials and up to around 1.9 for certain mineral glasses.

This problem is clearly illustrated when protection against UV radiation is characterized by means of an "e-spf" factor (eye-sun protection factor) described in patent application WO 2013/092377 that takes into account both UV radiation transmitted through the lens ($T_{UV}$), and also UV radiation ($R_{UV}$) reflected on the rear face of the lens. In particular it appears that this factor essentially depends on the $R_{UV}$ for the substrates with an index greater than or equal to around 1.6, since these are generally made of material that absorbs the UV radiation almost completely, resulting in a $T_{UV}$ close to zero.

For the protection of the eyes against UV radiation, only the transmission ($T_{UV}$) is conventionally taken into account in ophthalmic equipment. When the reflected radiation ($R_{UV}$) is taken into account, the protection solutions proposed depend on the use of antireflection coatings on the rear face of the glass that have a very low reflection coefficient in the ultraviolet. However, such a solution is complex and expensive and is not possible for all ophthalmic lenses.

The object of the present invention aims to at least partly resolve the aforementioned drawbacks and to obtain other advantages.

For this purpose, according to a first aspect, an ophthalmic lens is proposed comprising a substrate having a given refractive index and a coating that minimizes ultraviolet reflections having a given refractive index and being present on the rear face of said substrate, wherein the coating that minimizes ultraviolet reflections has a thickness between around 1 μm and around 200 μm and wherein the refractive index of the coating that minimizes ultraviolet reflections is at least 0.15 units lower than the refractive index of the substrate.

The term "substrate" here denotes a body of the lens. It has a front face and a rear face, which is generally concave. The rear face is intended to be the face closest to the eyes of a wearer of spectacles manufactured from the lens.

The coating that minimizes ultraviolet reflections is positioned on the side of the substrate intended to be the closest to the eye of a spectacle wearer. That is to say that it is typically positioned on the "rear" face of the substrate.

The coating that minimizes ultraviolet reflections is for example formed by a lacquer or a film also referred to as a "patch".

The coating that minimizes ultraviolet reflections according to the invention here has a thickness much greater than the wavelengths of the visible spectrum, which are generally between around 380 nm and around 790 nm, that is to say for example a thickness greater than or equal to around 1 μm. The thickness of the coating that minimizes ultraviolet reflections is for example between around 1 μm and around 200 μm.

This thickness is for example between around 60 μm and around 200 μm in a case where the coating is formed of a film, for example a film of thermoplastic material of the type deposited on the substrate by lamination or gluing. In a case where the coating is for example formed of a lacquer, the thickness is for example between around 1 μm and around 100 μm, or even between around 1 μm and around 10 μm, or even optionally between around 1 μm and around 5 μm or else between around 2 μm and around 5 μm.

By introducing a difference in the value of the indices between the index of the substrate and the index of the coating that minimizes ultraviolet reflections, it is thus possible to improve the e-spf (protection factor of a lens against UV radiation, mentioned above) of any ophthalmic lens.

The difference in the value of the indices is at least 0.15 units, that is to say for example for a coating having an index (i), the substrate will have an index of at least (i+0.15), or conversely for a substrate having an index (j), the coating will have an index of at most (j−0.15).

The values of the refractive indices of the substrate and of the coating are of course measured at the same predetermined wavelength. More specifically and unless otherwise indicated, the values of the refractive indices mentioned in the present document correspond to indices commonly known as "nD25" indices. The "n" corresponds to the value of the refractive index, the "D" corresponds to the D line (or spectral line) of sodium, while the "25" corresponds to the temperature in degrees Celsius. This consequently means that the measurements are carried out here at 25° C. with a sodium lamp and are determined at the D line of the spectrum obtained, i.e. at a wavelength equal to around 589 nm. It will be noted that a refractive index value determined at a wavelength more generally between around 550 nm and 600 nm could be almost identical to the value determined at 589 nm (at nD25), the resulting difference often being only 0.01 units.

By virtue of such an improvement in the protection against ultraviolet rays, it is possible to raise the protection level range of the lens for a substrate under consideration.

This solution is contrary to the teaching of the recent art regarding ophthalmic lenses in particular. Indeed, it is generally accepted that it is preferable, or even necessary, to limit the difference between the refractive index of a lacquer and the refractive index of the substrate on which it is deposited, or even to make them equal, for the purpose of limiting the presence of interference fringes, a problem that is amply described in European patent application EP1 362 246.

For this purpose, the ophthalmics industry produces, for high-index substrates, scratch-resistant or impact-resistant coatings having an index that is for example as high as possible in order to be able to match them with said high-index substrates.

In accordance with the invention, coating a substrate, for example a high-index substrate, with a coating that minimizes ultraviolet reflections, for example a low-index lacquer, makes it possible to produce a lens with a low degree of reflection of UV radiation while dispensing with the vacuum deposition step customarily required for forming an antireflection coating that reduces the reflection of UV radiation, which makes the ophthalmic lens simpler to produce.

As mentioned above, in the calculation of the e-spf, the two factors to be taken into account are the $T_{UV}$ and the $R_{UV}$, as shown by the following equation from patent application WO 2013/092377:

$$e-spf = \frac{1}{R_{UV} + T_{UV}}$$

The $T_{UV}$ represents the mean transmission value, in the spectral band corresponding to UV radiation, through a substrate. This value is zero for most of the other materials used in ophthalmics having an index greater than or equal to 1.59 since they block the transmission of UV radiation.

As for the $R_{UV}$, it represents the mean reflection value, in the spectral band corresponding to UV radiation, at the surface of a lens. If the thickness of the outermost coating is greater than around two to three times the UV wavelengths (which are less than 380 nm), then the $R_{UV}$ may be considered to a first approximation to be a function of the index of this coating. If the outermost coating is a coating whose thickness is much smaller than the UV wavelengths, for example with a thickness of around 5 nm to 20 nm, then this coating generally has no influence on the $R_{UV}$ and the $R_{UV}$ should be considered to be provided by the immediately adjacent coating(s). In the case of one or more coatings having thicknesses between 0.05 and 1 times the wavelength, the $R_{UV}$ will depend, inter alia, on the constructive and destructive interferences produced by the light that encounters these coatings and the material present underneath these coatings.

Thus, when the substrate has a very low $T_{UV}$, the less the rear face of the glass reflects UV radiation toward the eyes of the wearer, the more the glass provides good protection against UV radiation and the higher the e-spf.

Within the context of a coating that minimizes ultraviolet reflections according to the invention, for example formed by a lacquer, the $R_{UV}$ will increase with the index of the outermost material, which means that the lacquers having a high index greater than 1.5, or even 1.56, or even 1.6, conventionally combined, respectively, with substrates having a high index greater than 1.5, or even 1.56, or even greater than 1.6, will form lenses with very high $R_{UV}$ values, and consequently poor e-spf values.

It should be noted that the e-spf is commercially divided into segments, and is broken down into six categories in the following manner:

| e-spf < 6.25: | class 0 |
| e-spf 6.25-12.5: | class 10 |
| e-spf 12.5-20: | class 15 |
| e-spf 20-30: | class 25 |
| e-spf 30-50: | class 35 |
| e-spf > 50: | class 50. |

In order to understand one of the supplementary effects of the invention, it should be noted that a bare substrate having an index of 1.6, which would virtually completely absorb the UV radiation, has an e-spf of 19, which positions it in the commercial class 15. Similarly, a bare substrate made of polycarbonate (PC), having an index of 1.59, would have an e-spf of around 19.5, which also positions it in class 15. The same is true for all bare substrates having an index greater than 1.59.

The table below presents examples of e-spf for bare substrates having various indices.

| Index of the substrate | e-spf | Class e-spf | RUV | TUV |
|---|---|---|---|---|
| 1.50 | 10 | 10 | 4.00 | 1.84 |
| 1.55 | 15 | 15 | 4.65 | 1.81 |
| 1.59 | 19.5 | | 5.19 | 0 |
| 1.60 | 19 | | 5.33 | 0 |
| 1.67 | 16 | | 6.30 | 0 |
| 1.74 | 14 | | 7.29 | 0 |

From a UV protection point of view, it is important for glasses to have an e-spf of a class greater than 25 and preferentially greater than 30. This commercial requirement is greater for substrates of higher index: 1.59, 1.6, 1.67 or 1.74 which are of e-spf class 15 and lesser for substrates of lower index: 1.5 or 1.56 to which a lacquer that blocks UV transmission is generally added, which gives them an e-spf factor between 20 and 25, i.e. class 25.

The table below presents an example of measured e-spf values for a lens as a function of index values of a coating that minimizes ultraviolet reflections formed by a lacquer and present as the outermost coating (excluding a thinner, optional surface top coat) on a substrate having an index of 1.6, here made of polymethyl methacrylate (PMMA).

| Index of the lacquer | e-spf |
|---|---|
| 1.40 | 36 |
| 1.42 | 33 |
| 1.44 | 31 |
| 1.46 | 29 |
| 1.48 | 27 |
| 1.50 | 25 |
| 1.52 | 23 |
| 1.54 | 22 |
| 1.56 | 21 |
| 1.58 | 20 |
| 1.60 | 19 |

This table makes it possible to demonstrate that the use of a coating having an index at least 0.15 lower than that of the substrate improves the e-spf (being equal for example to 31 for a lacquer having an index of 1.44), which would position the lens in class 35, versus 19 for a lacquer having an index of 1.6, the closest index to that of the substrate, which would position the lens in class 15.

A high-index substrate having an index value of 1.60 for example, covered on the rear face by a coating according to the invention having an index of 1.44 or less thus has an e-spf of at least 30, or even 31, which positions it in e-spf class 35.

Thus, the coating according to the invention, formed for example by a lacquer, applied to a substrate, for example having an index of 1.59 and even more a substrate having an index of 1.6, has the advantage of being able to offer high-index glasses of simple production that have however a high protection against UV radiation.

| Substrate index $n_s$ | Bare substrate e-spf | Substrate e-spf class | Lacquer index (around $n_s$ −0.15) | Lacquered substrate e-spf | Lacquered substrate e-spf class |
|---|---|---|---|---|---|
| 1.55 | 21.5 | 25 | 1.40 | 36 | 35 |
| 1.59 | 19.5 | 15 | 1.44 | 31 | 35 |
| 1.60 | 19 | 15 | 1.46 | 29 | 25 |
| 1.64 | 17 | 15 | 1.50 | 25 | 25 |
| 1.67 | 16 | 15 | 1.52 | 23 | 25 |
| 1.74 | 14 | 15 | 1.58 | 20 | 25 |

The above table makes it possible to demonstrate in a general manner for the known substrates that the use of a coating having an index at least 0.15 lower than that of the substrate improves the e-spf significantly, generally making it possible to change e-spf class or even to move up two e-spf classes. Thus, for a lacquer having an index of 1.40, on a substrate having an index of 1.55, the e-spf is 36 which would position the lens in class 35 instead of class 25, or else 20 for a lacquer having an index of 1.58 on a substrate having an index of 1.74, which would position the lens in class 25 instead of class 15.

According to one advantageous exemplary embodiment, the substrate is a high-index substrate. That is to say for example that the substrate has a refractive index greater than or equal to around 1.56, or even preferentially greater than or equal to around 1.59, or even preferentially greater than or equal to 1.6. The refractive index of the substrate is for example between around 1.56 and around 1.9, or even between around 1.59 and around 1.9, or even between around 1.6 and around 1.9.

The substrate may thus be of any type, such as for example a conventional ophthalmics substrate having an optical refractive index greater than 1.6, for example a thermosetting or thermoplastic organic material.

For example, the substrate is made of polythiourethane, such as MR8® or MR7®, respectively having a refractive index of 1.60 and 1.66, distributed by Mitsui Toatsu, or else the substrate is made of PMMA (polymethyl methacrylate), in particular the PMMA ACRYLITE 8N-453® sold by Evonik and having a refractive index of 1.60.

According to one advantageous implementation example, the coating that minimizes ultraviolet reflections has a refractive index less than or equal to around 1.45, or even around 1.42. For example, the refractive index of the coating that minimizes ultraviolet reflections is between around 1.30 and around 1.45, or even between around 1.30 and around 1.42, or between around 1.35 and around 1.45, or else between around 1.35 and around 1.42. The coating that minimizes ultraviolet reflections is for example formed by a low-index lacquer, that is to say a lacquer having an index less than or equal to 1.45, or even 1.42 or even 1.4. It is for example between around 1.30 and 1.45, or even between 1.35 and 1.45, for example around 1.4 or 1.42.

According to one exemplary embodiment, the coating that minimizes ultraviolet reflections is formed by a lacquer obtained from a composition comprising between around 10% and around 85% by weight of solids of at least two different polyalkoxysilanes.

Within the context of the present application, and unless expressly indicated otherwise, the percentages are considered to be percentages by weight relative to the total weight of solids of the composition of the initial preparation.

According to one particular example, the composition may comprise a polyalkoxysilane, or a hydrolyzate of said polyalkoxysilane, of formulation:

in which x is an integer between 2 and 4, each R1 is independently selected from (C1-C6)alkyl, aryl and aryl(C1-C6)alkyl, and each R2 is independently selected from (C1-C6)alkyl.

Within the meaning of the present invention, the term "(C1-C6)alkyl" denotes any monovalent linear or branched group having from 1 to 6 carbon atoms. The (C1-C6)alkyls comprise in particular (C1-C4)alkyls such as methyl, ethyl, propyl, isopropyl, butyl, isobutyl and tert-butyl.

Within the meaning of the present invention, the term "aryl" denotes any monovalent aromatic group having from 6 to 18 carbon atoms, optionally substituted by 1 to 4 groups, which are identical or different independently of one another, selected from halogen, (C1-C6)alkyl, (C1-C6)alkyloxy. The aryls comprise in particular phenyl, tolyl and naphthyl.

Within the meaning of the present invention, the term "aryl(C1-C6)alkyl" denotes any (C1-C6)alkyl group as defined above substituted by an aryl group as defined above. The aryl(C1-C6)alkyls comprise in particular aryl(C1-C4) alkyls such as benzyl and phenylethyl.

The composition may also comprise at least one organosilane compound or hydrolyzate thereof, of formula:

in which the R groups, which are identical or different, are monovalent organic groups bonded to the silicon by a carbon atom and containing at least one epoxy function; the X groups, which are identical or different, are hydrolyzable groups; Y is a monovalent organic group bonded to the silicon by a carbon atom, n and m being integers such that n=1 or 2 with n+m=1 or 2.

The composition of the lacquer may comprise for example TEOS (tetraethoxysilane, $Si(OC_2H_5)_4$), and/or the composition may for example comprise at least one polyalkoxysilane, comprising at least one methyl ($CH_3$—) group directly bonded to the silicon (Si) atom, such as MTMS (methyltrimethoxysilane, $CH_3Si(OCH_3)_3$) or MTES (methyltriethoxysilane, $CH_3Si(OC_2H_5)_3$) or DMDES (dimethyldiethoxysilane, $(CH_3)_2Si(OC_2H_5)_2$).

According to one exemplary embodiment, the polyalkoxysilanes of the composition of the lacquer are selected from a methyltrimethoxysilane (MTMS), a methyltriethoxysilane (MTES), a dimethyldiethoxysilane (DMDES), a γ-glycidoxypropyltrimethoxysilane (GLYMO), or else a tetraethoxysilane (TEOS).

In the absence of additions of colloids or of additional monomers that can modify the index, the index of the laquers obtained from the compositions using these silanes is around 1.42.

MTMS, or better still MTES (methyltriethoxysilane), are the most suitable silanes, alone or combined with TEOS (tetraethoxysilane), due to their low indices. One advantage is that the mixture comprising MTMS (or MTES) and TEOS makes it possible, by varying the proportion of TEOS, to vary the hardness properties of the coating that minimizes ultraviolet reflections.

For some compositions the coating that minimizes ultraviolet reflections formed by a lacquer used by the invention may also be used as an abrasion-resistant coating. Silica colloids or hollow silica may thus be added to its composition in order to increase the hardness of the coating and/or to lower the index.

Furthermore, when it is a question of a lacquer, its composition is preferentially selected on the basis of the nature of the substrate. For example, on an acrylic substrate having an index of 1.6, the lacquer is advantageously based on a mixture of an MTES (methyltriethoxysilane) silane and a TEOS (tetraethoxysilane) silane. The index of such a formulation is thus close to 1.42.

Optionally, for certain substrates, the composition of the lacquer comprises DBU (1,8-diazabicyclo[5.4.0]undec-7-ene), and/or acetic acid in order to promote the hardness and the adhesion.

For other high-index substrates, it is possible to add other silanes, comprising functional groups other than the silane, in order to improve the adhesion, the final index will be close to 1.44 depending on the amounts used.

Optionally, the lacquer comprises GLYMO (γ-glycidoxypropyltrimethoxysilane) in order to promote the adhesion to the aforementioned polyurethane-based substrates.

A lacquer according to one embodiment of the present invention comprises for example the following composition:
MTMS or MTES, alone or combined with TEOS: at least around 15%, or even 20% by weight relative to the solids;
GLYMO (γ-glycidoxypropyltrimethoxysilane) at less than around 25%, for example between around 5% and around 25%, or even around 20%, or even preferably in an amount less than or equal to 10% by weight relative to the solids depending on the nature of the substrate for which the lacquer is intended;
an acid capable of initiating the hydrolysis of the monomers; the acid may be a carboxylic acid selected for example from acetic acid, propionic acid, butyric acid, acrylic acid and mixtures thereof; preferably the acid is acetic acid;
a condensation catalyst selected in particular from imidazoles, amidines and cyclic or bicyclic amidines.

Examples of a condensation catalyst include N-methylimidazole, diazabicycloundecene and diazabicyclononene. Preferably, the condensation catalyst is 1,8-diazabicyclo [5.4.0]undec-7-ene (DBU).

These monomers are preferentially in the aforementioned monomeric form but may be partially or completely in their hydrolyzed form.

It is also possible to add hollow silica, which makes it possible to further lower the index, and in particular when the index of the lacquer, without hollow silica, is greater than 1.45.

Specifically, the index of the hollow silica depends on the mean size of the hollow silica particles. More specifically, the index of the hollow silica is inversely proportional to a ratio between the volume of the cavity at the core of the particle and the volume of the silica particle. This ratio drops when the size of the silica particles decreases.

However, it is important to note that for hollow silica particles having a diameter greater than or equal to around 40 nm or 50 nm, the introduction of hollow silica in a large amount (that is to say greater than 40%, respectively 50%, by weight of solids of the lacquer composition) may lead to diffusing lacquers being formed.

Thus, according to one advantageous exemplary embodiment, the lacquer forming the coating that minimizes ultraviolet reflections is obtained from a composition comprising between around 5% and around 50%, by weight of solids, of hollow silica.

And for example, the hollow silica has particles with a diameter less than or equal to around 100 nm, for example a diameter between around 30 nm and around 60 nm. Thus, the hollow silica particles are preferably selected with a diameter between around 40 nm and around 60 nm, preferably with a mean diameter close to 50 nm.

Additionally, the lacquer may also be obtained from a composition comprising at least one fluorosilane monomer, for example between 0% and around 10% by weight. The fluorosilane makes it possible to lower the index. One example of a fluorosilane monomer may be (3,3,3-trifluoropropyl)trimethoxysilane.

Thus, for example, the e-spf of a lens with a high-index substrate coated with a lacquer having an index of 1.42 is thus for example greater than 30, whereas it would only be 19 for a lens comprising a lacquer having an index of 1.6.

According to one advantageous exemplary embodiment, the lens additionally comprises a quarter-wave coating configured to limit interference fringes, also denoted here as quarter-wave layer, also known as "anti-fringe" layer or interference layer, or even interference quarter-wave layer. The quarter-wave coating is located between the substrate and the coating that minimizes ultraviolet reflections.

A quarter-wave layer thus makes it possible to minimize an optional presence of interference fringes that may be generated by the difference in index between the substrate and the lacquer.

Such a quarter-wave layer is for example described in patent application EP 1 362 246, included by reference. It is then positioned between the substrate and the lacquer.

Customarily, this type of layer is used, as illustrated in patent application EP 1 362 246, when the refractive index of the lacquer is not exactly matched to that of the substrate, even though the lacquer was chosen so as to have an index having the smallest possible difference with that of the substrate.

As stated in application EP 1 362 246, the quarter-wave layer comprises at least one colloidal mineral oxide generally selected from $SiO_2$, $TiO_2$, $ZrO_2$, $SnO_2$, $Sb_2O_3$, $Y_2O_3$, $Ta_2O_5$ and mixtures thereof. The preferred colloidal mineral oxides are $SiO_2$, $TiO_2$, $ZrO_2$ and the $SiO_2/TiO_2$ and $SiO_2/ZrO_2$ mixtures.

The preferred colloidal silicas are the silicas prepared by the Stöber process. The Stöber process is a simple and well-known process that consists of a hydrolysis and a condensation of ethyl tetrasilicate, also known as tetraethoxysilane ($Si(OC_2H_5)_4$ or TEOS), in ethanol catalyzed by ammonia. The process makes it possible to obtain a silica directly in ethanol, a virtually monodisperse particle population, an adjustable particle size and a functionalized particle surface of ($SiO^-NH_4^+$) type.

In the case where the quarter-wave layer is composed of a mixture of colloidal mineral oxides, preferably the mixture comprises at least one high-index oxide, that is to say having a refractive index greater than or equal to around 1.54 and at least one low-index oxide, that is to say having a refractive index less than around 1.54. Preferably, the mixtures of mineral oxides are binary mixtures, in particular of a low-index oxide and a high-index oxide. Generally, the low-index oxide/high-index oxide weight ratio varies from around 20/80 to around 80/20, preferably from around 30/70 to around 70/30 and better still from around 40/60 to around 60/40.

The size of the mineral oxide particles generally varies from around 10 nm to around 80 nm, preferably from around 30 nm to around 80 nm and better still from around 30 nm to around 60 nm.

In particular, the mineral oxide may consist of a mixture of small-sized particles, that is to say from around 10 nm to around 15 nm and of large-sized particles, that is to say from around 30 nm to around 80 nm.

Typically, the quarter-wave layer has a thickness between around 60 nm and around 100 nm, preferably between around 70 nm and around 95 nm, and better still between around 80 nm and around 95 nm, or even better still between 85 nm and 95 nm. This thickness should be as close as possible to the theoretical thickness of a quarter-wave layer (lambda/(4.n) with lambda a representative wavelength and n the index of the quarter-wave layer), considering the materials used for the optical article, in order to attenuate the interference fringes.

Thus, for example, the quarter-wave coating is composed of two types of oxide nanoparticles having different indices. For example, a first of the two types of oxide nanoparticles is silica ($SiO_2$) and a second of the two types of oxide nanoparticles is zirconia ($ZrO_2$), also known as zirconium dioxide.

The zirconia can be replaced in certain cases by other high-index oxides, for example $TiO_2$ or $Ta_2O_5$.

Thus, the quarter-wave layer is for example formed from a mixture of colloids, for example silica ($SiO_2$) and zirconia ($ZrO_2$), dispersed for example in ethanol.

The respective amount of the oxides depends on the refractive index of the substrate and sometimes on the refractive index of the lacquer as is for example illustrated by the table described subsequently.

In one embodiment, the quarter-wave layer is obtained by deposition of colloidal oxide particles, that is to say in the form of particles, either by spin coating, or by dip coating. After deposition and removal of the solvent, a thin layer of oxide particles comprising an open porosity, the space between the particles, remains on the substrate.

In this text, a colloid is understood to mean either a solution comprising nanoscale particles or nanoparticles, in colloidal suspension in a solvent, or the nanoparticles themselves depending on the context.

Advantageously, no fill material is used prior to the deposition of the lacquer layer. Thus, according to one advantageous exemplary embodiment, the lacquer forms a fill material of the quarter-wave layer between the oxide nanoparticles. This enables the mechanical hold of the quarter-wave layer/lacquer assembly on the substrate without depending solely on an adhesion between the substrate and the colloids of the quarter-wave layer; the adhesion being provided by the lacquer in contact with the substrate through the porous quarter-wave layer.

Furthermore, this may make it possible, to a first approximation, to dispense with modifying the composition of the oxide particles as a function of the index of the lacquer. Thus, the composition of the oxide particles, and for example the ratio between two types of particles (here $ZrO_2$ and $SiO_2$ preferably), may be selected solely on the basis of the index of the substrate, and will not change when the index of the chosen lacquer is 1.42, 1.44 or even 1.40.

Usually, for a substrate of given index, the quarter-wave layer is selected on the basis of the chosen lacquer. More specifically, among two lacquers of different indices, if the lacquer of lowest index is selected, the chosen quarter-wave layer should have an index lower than that of the quarter-wave layer that would have been selected if the lacquer of highest index had been chosen.

However, when the quarter-wave layer is produced by liquid-phase deposition of colloidal particles and when the material of the lacquer serves as fill material, it is not necessary, to a first approximation, to modify the colloid composition. This is because the material of the lacquer is incorporated between the particles of the colloid. Then, the index of the quarter-wave layer depends on the index of the colloids, on the relative proportion thereof, and on the index and the proportion of the material of the lacquer inserted between the particles.

Thus, if the lacquer of lower index is chosen instead of a lacquer of higher index, with a difference D between their indices which is at most equal to around 0.05 units, the index of the quarter-wave layer chosen is lower by a magnitude D' approximately equal to 0.4*D to 0.5*D relative to the index of the quarter-wave layer that would have been selected if the lacquer of higher index had been chosen. This small difference makes it possible, to a first approximation, to only have to select the index of the quarter-wave layer relative to the index of the substrate so that the quarter-wave layer can, to a first approximation, fulfill its role.

Finally, according to one exemplary embodiment, the lens additionally comprises at least one top coat, also known as a surface top coat, it being possible for this to be selected for example from an antistatic coating, an anti-soiling coating, in particular an anti-fogging coating. And preferably, the top coat is applied directly on the coating that minimizes ultraviolet reflections.

A process is also proposed for manufacturing an ophthalmic lens comprising a step of providing a substrate having a given refractive index and a step of depositing a coating that minimizes ultraviolet reflections having a given refractive index on a rear face of the substrate, wherein the step of depositing the coating that minimizes ultraviolet reflections is configured so that the coating that minimizes ultraviolet reflections has a thickness between around 1 μm and around 200 μm and has a refractive index at least 0.15 units lower than the refractive index of the substrate.

The expression "rear face of the substrate" means, in the invention, that the coating that minimizes ultraviolet reflections is present on a face of the lens intended to be positioned facing an eye of a wearer of spectacles provided with said lens.

If the coating that minimizes ultraviolet reflections is a lacquer, the lacquer is for example deposited by spin coating, spraying, or inkjet printing or else dip coating.

Furthermore, the lacquer is for example possibly deposited as a single layer.

According to one exemplary embodiment, the process for manufacturing a lens comprises a step of depositing a quarter-wave coating prior to the step of depositing the coating that minimizes ultraviolet reflections.

In one particular example, the quarter-wave layer has a thickness between around 60 nm and around 100 nm, preferably between around 70 nm and around 95 nm, and better still between around 80 nm and around 95 nm, or even better still between 85 nm and 95 nm and is deposited on the substrate by dip coating, that is to say by immersion, prior to the deposition of the coating that minimizes ultraviolet reflections.

The deposition by dip coating, that is to say by immersion, is for example carried out with a very slow speed, that is to say preferably at a speed less than or equal to around 2 mm/s, for example between around 0.5 mm/s and around 2 mm/s, or even between around 0.5 mm/s and around 1.2 mm/s. This speed relates to the extraction of the lens from the solution in which it is immersed. Owing to the composition of the colloidal solutions used to carry out the deposition of the layer of oxide particles, it is possible to limit, or even to dispense with a drying step, that is to stay a step during which a solvent is evaporated by heating. Specifically, during dip coating, in particular during the step of withdrawal at slow speed, a majority of the solvent is eliminated from the layer, for example by evaporation.

Thus, the process comprises for example a step of depositing the quarter-wave coating by dip coating, that is to say immersion, followed by a step of evaporation of a solvent contained in the solution of the quarter-wave coating, then a step of depositing the coating that minimizes ultraviolet reflections, for example by deposition of a lacquer.

According to one advantageous exemplary embodiment, the step of depositing the quarter-wave coating comprises a deposition of a colloidal composition of oxide nanoparticles, for example by immersion as described above.

And for example, the step of depositing the coating that minimizes ultraviolet reflections comprises a deposition of at least one layer of a lacquer forming a fill material between the oxide nanoparticles of the quarter-wave coating.

For example, the process comprises a step of immersing the substrate in a colloidal solution, comprising oxide nanoparticles in a solvent, then a step of evaporating the solvent.

The nanoparticles are then deposited on the substrate, on the rear face, for example by spin coating, and thus form a layer having an open porosity, as was mentioned above.

The process then comprises for example the step of depositing the lacquer on the quarter-wave layer, and the lacquer then forms the fill material between the nanoparticles present on the substrate.

Thus, the lacquer adheres to the substrate through the porous quarter-wave layer.

Finally, according to one exemplary embodiment, the process for manufacturing the lens comprises a step of depositing a top coat directly on the coating that minimizes ultraviolet reflections.

Other features and advantages of the present invention will become more clearly apparent on reading the description given with reference to the appended figures, which are given by way of nonlimiting indication, and in which.

Figure 1:
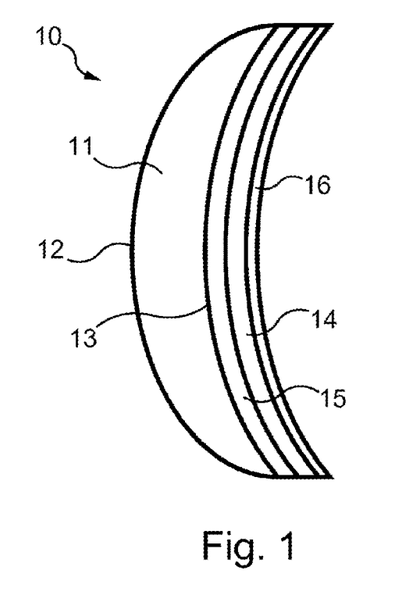
FIG. 1 presents an ophthalmic lens according to one exemplary embodiment of the present invention.

FIG. 1 presents an ophthalmic lens 10 according to one exemplary embodiment of the present invention.

The ophthalmic lens 10 comprises a substrate 11, forming a body of the lens.

The substrate 11 comprises a front face 12 and a rear face 13, opposite the front face 12.

On the rear face 13, the ophthalmic lens 10 comprises a coating that minimizes ultraviolet reflections formed here by a layer of lacquer 14.

Here, a quarter-wave layer 15 is also present between the rear face 13 of the substrate 11 and the lacquer 14 as shown in FIG. 1. The quarter-wave layer 15 makes it possible in particular to minimize possible interference fringes that would, where appropriate, be aesthetically unacceptable.

The ophthalmic lens additionally comprises here an optional surface top coat 16, deposited on the layer of lacquer 14. This coating may be an antistatic coating, a hydrophobic or extra-hydrophobic coating, also referred to as an anti-soiling coating, or an anti-fogging coating for example.

In other words, apart from the top coat optionally present, the layer of lacquer is the outermost coating of the ophthalmic lens, that is to say the one then found at the surface.

According to a first exemplary embodiment of the present invention, the material of the layer of lacquer is obtained from a composition comprising a mixture of a hydrolyzate of 267.8 g of MTES and 38.8 g of TEOS which are hydrolyzed by 94.6 g of $H_2O$ and 20 g of acetic acid. During the hydrolysis, the temperature rises up to 46.1° C. The next day, around 2 g of DBU are added thereto as condensation catalyst, and also 15 g of acetic acid and 0.6 g of a surfactant. The lacquer thus obtained then has an index approximately equal to 1.42 and is the lacquer of index 1.42 used in the examples below.

In other words, the lacquer obtained is the result of the polymerization of the aforementioned elements.

According to a second exemplary embodiment of the present invention, the lacquer is obtained from a mixture of 178.1 g of MTES (i.e. 65% by weight of the solids content of the lacquer), 70.2 g of TEOS (15% of the solids content of the lacquer) and 38.2 g of GLYMO (γ-glycidoxypropyl-trimethoxysilane) (20% of the solids content of the lacquer). The MTES, TEOS and GLYMO are hydrolyzed by 103.7 g of $H_2O$ and 20 g of acetic acid. During hydrolysis, the temperature rises up to 40° C. approximately. The next day, around 2 g of DBU are added thereto as condensation catalyst, and also 32.5 g of isopropanol and 0.6 g of a surfactant. The lacquer thus obtained then has an index approximately equal to 1.44, which is the lacquer of index 1.44 used in the examples below.

In the examples presented, when mention is made of hollow silica, this is the "THRULYA 1110" silica supplied by JGC, having a mean particle diameter of around 30 nm, an optical index close to 1.35 and a density of around 1.2.

According to a third exemplary embodiment of the present invention, a lacquer according to the first exemplary embodiment additionally comprises around 25% by weight of solids of hollow silica having a mean dimension close to 30 nm. The lacquer thus obtained then has an index approximately equal to 1.4.

According to a fourth exemplary embodiment of the present invention, a lacquer according to the second exemplary embodiment additionally comprises around 25% by weight of solids of hollow silica having a mean dimension close to 30 nm. The lacquer thus obtained then has an index approximately equal to 1.42.

According to a fifth and a sixth exemplary embodiment of the present invention, hollow silica having a mean dimension less than 30 nm is used to replace at least one portion of the silica present in the commercial lacquer of index 1.47 formed for example, according to document EP 0 614 957, in the following manner: 80.5 parts of 0.1N hydrochloric acid are added dropwise to a solution containing 224 parts of GLYMO (of index 1.51) and 120 parts of DMDES (of index 1.4, equivalent to around 20% by weight of the solids before reaction and around 13% by weight of the solids after condensation of the lacquer). The hydrolyzed solution is stirred for 24 hours at ambient temperature, i.e. around 25° C., then 718 parts of 30% colloidal silica in methanol are added (that is to say nanoparticles having an index of 1.45 approximately), and also 15 parts of aluminum acetylacetonate and 44 parts of ethyl cellosolve. A small amount of surfactant is then added. The theoretical solids content (TSC) weight of the composition is then of the order of 35%.

Thus, according to the fifth example, in the composition, 58% by weight of the colloidal silica present in the colloidal suspension are replaced by hollow silica so that the hollow silica nanoparticles represent 25% of the weight of solids, and the colloidal silica represents 18% of the weight of the solids. The lacquer obtained thus has an index of around 1.44.

According to the sixth example, in the composition, 85% of the colloidal silica present in the colloidal suspension are replaced by hollow silica so that the hollow silica nanoparticles represent 36.5% of the weight of solids. The lacquer obtained thus has an index of around 1.43.

Figure 2:
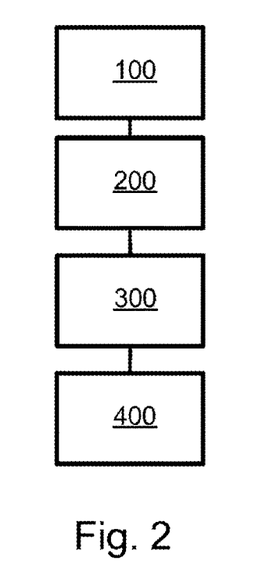
FIG. 2 shows a flowchart depicting a process for manufacturing an ophthalmic lens according to one exemplary embodiment of the present invention.

As illustrated in FIG. 2, an ophthalmic lens according to one exemplary embodiment of the present invention is possibly produced in the following manner.

A first step 100 consists for example here in choosing a substrate 11 that has a refractive index greater than or equal to 1.6 and such that the substrate has at least one bare rear face 13, or even a bare front face 12 and a bare rear face 13.

An optional second step 200 consists for example of a step of depositing a quarter-wave layer. The step of depositing the quarter-wave layer is for example carried out with a very slow speed, that is to say between around 0.5 mm/s and around 2 mm/s, and with a thickness of between around 60 nm and around 100 nm, preferably between around 70 nm and around 95 nm, and better still between around 80 nm and around 95 nm, or even better still between 85 nm and 95 nm. This second step 200 possibly comprises a step of evaporating a solvent present in the solution for preparing the quarter-wave layer, then leaving the nanoparticles on the rear surface of the substrate.

A third step consists in giving the lens UV-resistant properties. For this, the third step 300 here comprises a step of depositing, on the rear face 13 of the substrate 11, a layer of a lacquer 14 that has a refractive index less than or equal to 1.45. Preferably, the lacquer is applied so as to have a thickness greater than or equal to 1 μm, preferably a thickness between around 1 μm and around 5 μm. This is for example carried out by spin coating, spraying, inkjet printing or dip coating. The lacquer then optionally serves as fill material for the porous quarter-wave layer, formed for example by the nanoparticles deposited at the surface of the substrate. The layer of lacquer 14 having a thickness of at least 1 μm is possibly applied as a single layer, but may also be produced as several layers.

Finally, an optional fourth step 400 consists in applying a top coat to the lacquer.

By way of illustration, the table below presents examples of indices and thicknesses of the quarter-wave layer, as a function of examples of contents of silica and zirconia calculated approximately, to be deposited on the substrate as a function of its index and of the index of the lacquer (which is that presented according to the first exemplary embodiment for the lacquer of index 1.42 and according to the second exemplary embodiment for the lacquer of index 1.44).

| Substrate Index | Lacquer Index | Quarter-wave ayer | | | | |
|---|---|---|---|---|---|---|
| | | Thickness Index | (nm) | Colloid content SiO$_2$ | ZrO$_2$ | e-spf |
| 1.60 | 1.42 | 1.5073 | 91.22 | 53% | 47% | 33 |
| 1.67 | 1.42 | 1.5399 | 89.29 | 39% | 61% | 33 |
| 1.74 | 1.42 | 1.5719 | 87.47 | 28% | 72% | 33 |

-continued

| Substrate Index | Lacquer Index | Quarter-wave ayer | | | | |
|---|---|---|---|---|---|---|
| | | Thickness Index | (nm) | Colloid content SiO$_2$ | ZrO$_2$ | e-spf |
| 1.60 | 1.44 | 1.5179 | 90.59 | 53% | 47% | 31 |
| 1.67 | 1.44 | 1.5507 | 88.67 | 39% | 61% | 31 |
| 1.74 | 1.44 | 1.5829 | 86.87 | 28% | 72% | 31 |

In particular in this example, the substrate of index 1.6 is made of PMMA, and the substrates of indices 1.6 or 1.67 are polythiourethanes and the substrate of index 1.74 is an episulfide.

Thus, for a given substrate, when the fill material of the quarter-wave layer is the lacquer, the colloidal ratio of the quarter-wave layer is practically independent of the index of the lacquer to be deposited.

On the other hand, it is observed that the content of silica and of zirconia influences the index of the quarter-wave layer; specifically, this varies from 1.5073 to 1.5829 by reducing the silica content from 53% to 28% and by increasing the zirconia content from 47% to 72%.

Thus, for example here, for a silica content between around 25% and around 55% and a zirconia content between around 45% and around 75%, the index of the quarter-wave layer is overall between around 1.50 and around 1.59. However, the respective contents depend essentially on the targeted index of the quarter-wave layer.

It is recalled that the values of the refractive indices of the substrate and of the coating mentioned above are measured at the same predetermined wavelength. More specifically, these values correspond to nD25 indices; that is to say that the measurements are carried out at 25° C. with a sodium lamp and are determined at the D line of the spectrum obtained, i.e. at a wavelength equal to around 589 nm.

It should be noted that a difference of at least 0.15 units between the values of two refractive indices measured according to the nD25 method should correspond to a difference of at least 0.1 units and more generally of at least 0.12 units according to another measurement method, where the values of indices would be obtained at a wavelength between around 300 nm and 350 nm, i.e. approximately within the range of the ultraviolet rays known as UV-B rays. The UV-B method would consequently give results that are not identical to the nD25 method, but that are close enough and are quantified at around 0.04 units of difference.

The invention claimed is:

1. An ophthalmic lens comprising a substrate having a given refractive index and a coating that minimizes ultraviolet reflections having a given refractive index and being present on the rear face of said substrate, wherein the coating that minimizes ultraviolet reflections has a thickness between around 1 μm and around 200 μm and wherein the refractive index of the coating that minimizes ultraviolet reflections is at least 0.15 units lower than the refractive index of the substrate.

2. The ophthalmic lens as claimed in claim 1, wherein the substrate has a refractive index greater than or equal to 1.56.

3. The ophthalmic lens as claimed in claim 1, wherein the coating that minimizes ultraviolet reflections has a refractive index less than or equal to 1.45.

4. The lens as claimed in claim 1, wherein the coating that minimizes ultraviolet reflections is formed by a lacquer obtained from a composition comprising between around 10% and around 85% by weight of solids of at least two different polyalkoxysilanes.

5. The lens as claimed in claim 4, wherein the polyalkoxysilanes are selected from a methyltrimethoxysilane (MTMS), a methyltriethoxysilane (MTES), a dimethyldiethoxysilane (DMDES), a γ-glycidoxypropyltrimethoxysilane (GLYMO), or a tetraethoxysilane (TEOS).

6. The lens as claimed claim 4, wherein the lacquer is obtained from a composition comprising between around 5% and around 50% by weight of solids of hollow silica, and the hollow silica has particles with a diameter less than or equal to around 100 nm.

7. The lens as claimed in claim 4, wherein the lacquer is obtained from a composition comprising at least one fluorosilane monomer.

8. The lens as claimed in claim 1, comprising a quarter-wave coating configured to limit interference fringes, the quarter-wave coating being located between the substrate and the coating that minimizes ultraviolet reflections.

9. The lens as claimed in claim 8, wherein the quarter-wave coating is composed of two types of oxide nanoparticles having different indices.

10. The lens as claimed in claim 9, wherein a first of the two types of oxide nanoparticles is silica ($SiO_2$) and a second of the two types of oxide nanoparticles is zirconia ($ZrO_2$), and the lacquer forms a fill material of the quarter-wave layer between the oxide nanoparticles.

11. The lens as claimed in claim 1, comprising a top coat applied directly on the coating that minimizes ultraviolet reflections.

12. A process for manufacturing an ophthalmic lens comprising a step of providing a substrate having a given refractive index and a step of depositing a coating that minimizes ultraviolet reflections having a given refractive index on a rear face of the substrate, wherein the step of depositing the coating that minimizes ultraviolet reflections is configured so that the coating that minimizes ultraviolet reflections has a thickness between around 1 μm and around 200 μm and has a refractive index at least 0.15 units lower than the refractive index on the substrate.

13. The process as claimed in claim 12, comprising a step of depositing a quarter-wave coating prior to the step of depositing the coating that minimizes ultraviolet reflections.

14. The process as claimed in claim 13, wherein the step of depositing the quarter-wave coating comprises a deposition of a colloidal composition of oxide nanoparticles and the step of depositing the coating that minimizes ultraviolet reflections comprises a deposition of at least one layer of a lacquer forming a fill material between the oxide nanoparticles of the quarter-wave coating.

15. The process as claimed in claim 12, comprising a step of depositing a top coat directly on the coating that minimizes ultraviolet reflections.

16. The ophthalmic lens as claimed in claim 2, wherein the substrate has a refractive index greater than or equal to 1.59.

17. The ophthalmic lens as claimed in claim 16, wherein the substrate has a refractive index greater than or equal to 1.6.

18. An ophthalmic lens comprising a substrate having a given refractive index and a coating that minimizes ultraviolet reflections having a given refractive index and being present on the rear face of said substrate, wherein the coating that minimizes ultraviolet reflections has a thickness between around 1 μm and around 200 μm and wherein the refractive index of the coating that minimizes ultraviolet reflections is at least 0.15 units lower than the refractive index of the substrate; and wherein the coating is an uppermost layer on the rear face of the ophthalmic lens.

19. The ophthalmic lens of claim 1, wherein the coating that minimizes ultraviolet reflections is not a quarter wavelength layer.

\* \* \* \* \*

UNITED STATES PATENT AND TRADEMARK OFFICE
CERTIFICATE OF CORRECTION

PATENT NO. : 10,302,820 B2  
APPLICATION NO. : 15/500209  
DATED : May 28, 2019  
INVENTOR(S) : Yves Leclaire Page 1 of 1

It is certified that error appears in the above-identified patent and that said Letters Patent is hereby corrected as shown below:

On the Title Page

<u>Item (57) ABSTRACT, Line 6:</u>
Delete "I μm" and replace with -- 1 μm --.

In the Claims

<u>Claim 6, Column 15, Line 9:</u>
Delete "claimed claim" and replace with -- claimed in claim --.

Signed and Sealed this  
Thirteenth Day of August, 2019

Andrei Iancu  
*Director of the United States Patent and Trademark Office*